March 19, 1957  W. G. KÖGEL  2,785,543

ABSORPTION REFRIGERATION SYSTEM

Filed March 30, 1954

INVENTOR.
Wilhelm Georg Kögel
BY Edmund A. Fernandez
his ATTORNEY

United States Patent Office 2,785,543
Patented Mar. 19, 1957

2,785,543
ABSORPTION REFRIGERATION SYSTEM

Wilhelm Georg Kögel, Stockholm, Sweden, assignor to Aktiebolaget Elektrolux, Stockholm, Sweden, a corporation of Sweden Application March 30, 1954, Serial No. 419,824

Claims priority, application Sweden March 31, 1953

9 Claims. (Cl. 62—119.5)

My invention relates to absorption refrigeration systems, and more particularly to distribution of absorption liquid circulating in such systems.

In systems of this type circulation of absorption liquid is effected by vapor-lift action between a vapor expulsion unit and an absorber, the absorption liquid from the vapor expulsion unit to the absorber flowing in heat exchange relation with the absorption liquid from the absorber to the vapor expulsion unit. When absorption liquid is raised by a vapor-lift pump to effect such circulation of the liquid, it often is desirable to conduct only a part of the raised absorption liquid from the vapor expulsion unit to the absorber, and to recirculate in a local circuit another part of the raised absorption liquid which never reaches the absorber.

It is an object of the invention to provide an improvement in systems of this type for accurately dividing absorption liquid while such liquid is being circulated.

Another object is to provide such an improvement for dividing absorption liquid flowing from the absorber to the vapor expulsion unit into several paths of flow before each part of the liquid is influenced by the presence of vapor acting in the respective paths of flow to raise the liquid by vapor-lift action.

A further object is to provide such an improvement for recirculating a part of the raised absorption liquid through a passage of a vapor-lift pump, and circulating only a part of the raised liquid through the absorber, and, after enriched absorption liquid from the absorber passes through the heat exchanger, dividing such liquid into separate paths of flow leading to the vapor-lift pump.

The novel features, which I believe to be characteristic of my invention, are set forth with particularity in the claims. The invention, both as to organization and method, together with the above and other objects and advantages thereof, will be better understood by reference to the following description and accompanying drawing forming a part of this specification, and of which Fig. 1 more or less diagrammatically illustrates an absorption refrigeration system embodying the invention; and Fig. 2 is a fragmentary view of a system like that shown in Fig. 1 illustrating a modification of the invention.

Figure 1:
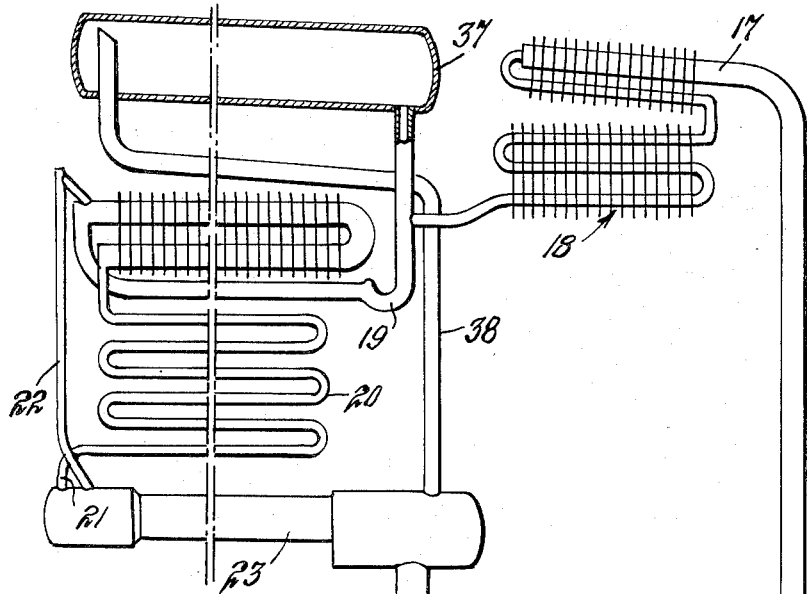
Figure 2:
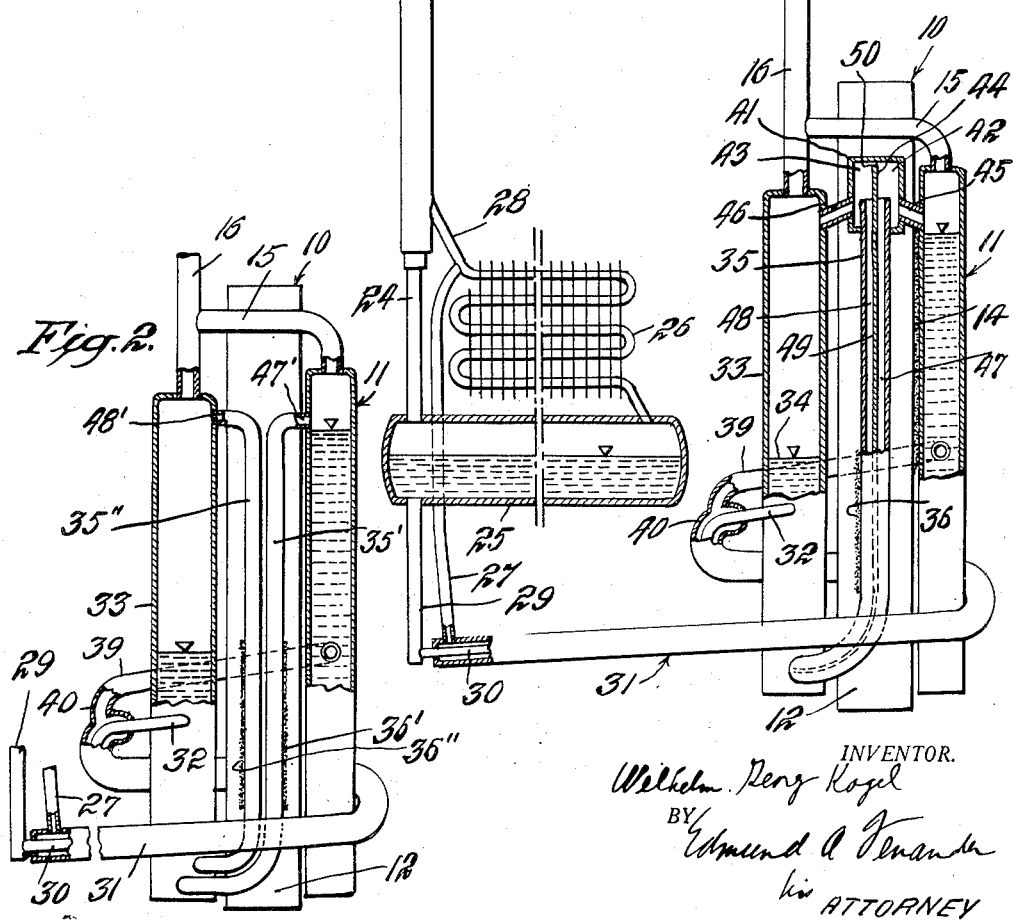

Referring to Fig. 1, I have shown my invention in connection with an absorption refrigeration system of a uniform pressure type, which is well known in the art, and in which a pressure equalizing gas is employed. Such a system comprises a generator or vapor expulsion unit 10, including a boiler 11 containing a refrigerant, such as ammonia, in solution in a body of absorption liquid, such as water. Heat is supplied to the boiler 11 from a heating tube or flue 12 thermally connected therewith at 14. The heating tube 12 may be heated in any suitable manner, as by an electrical heating element disposed within the lower part of the tube or by a liquid or gaseous fuel burner which is adapted to project its flame into the lower end of the tube.

The heat supplied to the boiler 11 and its contents expels refrigerant vapor out of solution, and the refrigerant vapor passes upwardly from the boiler through conduits 15 and 16 and an air-cooled rectifier 17 into an air-cooled condenser 18 in which it is condensed and liquefied.

Liquid refrigerant flows from condenser 18 through a conduit 19 into a cooling element 20 in which it evaporates and diffuses into an inert pressure equalizing gas, such as hydrogen, which enters through a conduit 21. Due to evaporation of refrigerant fluid into inert gas in cooling element 20, a refrigerating effect is produced with consequent absorption of heat from the surroundings.

The rich gas mixture of refrigerant vapor and inert gas formed in cooling element 20 flows from the upper part thereof through a conduit 22, one passage of a gas heat exchanger 23, conduit 24 and absorber vessel 25 into the lower end of an absorber coil 26. In absorber coil 26 the rich gas mixture flows counter-current to downwardly flowing absorption liquid which is introduced into the absorber through a conduit 27. The absorption liquid absorbs refrigerant vapor from inert gas, and inert gas weak in refrigerant flows from absorber coil 26 through a conduit 28, another passage of the gas heat exchanger 23 and conduit 21 into the lower part of cooling element 20.

The circulation of gas in the inert gas circuit just described is due to the difference in specific weight of the columns of gas rich and weak, respectively, in refrigerant vapor. Since the column of gas rich in refrigerant vapor and flowing from cooling element 20 to the absorber coil 26 is heavier than the gas weak in refrigerant and flowing from the absorber coil 26 to cooling element 20, a force is produced or developed within the system for causing circulation of inert gas in the manner described.

Absorption solution enriched in refrigerant flows from the absorber vessel 25 through a conduit 29 and an inner passage or pipe 30 of a liquid heat exchanger 31 disposed about the lower part of the vapor expulsion unit 10. Such enriched absorption solution is conducted from the passage or pipe 30 through a connection 32 into a vertically extending standpipe 33 at a point which is at a level below the liquid surface level in the absorber vessel 25 and also below the surface level 34 of the column of liquid contained in the standpipe 33. The extreme lower end of standpipe 33 is closed and in communication with the lower end of a vapor-lift pump 35 which is in thermal exchange relation with the heating tube 12 at 36. Liquid is raised by vapor-liquid lift action through pump 35 into the upper part of boiler 11. Refrigerant vapor expelled out of solution in boiler 11, together with refrigerant vapor discharged from the upper end of pump 35, flows upwardly from the vapor expulsion unit 10 through conduit 16 to the condenser 18, as previously described.

The outlet end of condenser 18 is connected by an upper extension of conduit 19, vessel 37 and conduit 38 to a part of the gas circuit, as at one end of gas heat exchanger 23, for example, so that any inert gas which may pass through the condenser 18 can flow into the gas circuit. Refrigerant vapor not liquefied in the condenser flows through the upper part of conduit 19 to displace inert gas in vessel 37 and force such gas into the gas circuit. The effect of forcing gas into the gas circuit in this manner is to raise the total pressure in the entire system, whereby an adequate condensing pressure is obtained to insure condensation of refrigerant vapor in condenser 18.

The principal part of generated vapor produced in the vapor expulsion unit 10 is expelled from solution in boiler 11 due to heating by the heating tube 12, and liquid of decreasing concentration flows downwardly by gravity in boiler 11 and passes therefrom through a conduit 39, the outer passage or pipe 40 of the liquid heat exchanger 31 and conduit 27 into the upper end of the absorber 26. The circulation of absorption solution in its circuit, which has just been described, is due to raising of solution by vapor-lift action in pump 35 from the lower end of standpipe 33 to a sufficiently high level at the upper end of the boiler 11.

A vessel 41 is provided at the upper end of the vapor-lift pipe 35 into which raised absorption solution is discharged. The vessel 41 is divided into two chambers 42 and 43 by a partition 44, one part of the raised absorption solution being discharged into the chamber 42 and the other part thereof being discharged into the chamber 43, in a manner to be described presently.

Raised absorption solution flows from chamber 42 through a conduit 45 into the upper end of boiler 11 and flows therefrom by gravity through the outer passage 40 of liquid heat exchanger 31 and conduit 27 to the upper end of the absorber 26. Raised absorption solution flows from chamber 43 through conduit 46 into standpipe 33 and mixes therein with absorption solution enriched in refrigerant and flowing from the absorber vessel 25 to the vapor expulsion unit 10. Hence, only a part of the absorption solution raised by vapor-lift action in the vapor-lift pump 35 is returned to the upper end of the absorber 26, while another part thereof is constantly recirculated by the vapor-lift pump 35 in a local circuit and never reaches the upper end of the absorber 26.

In accordance with my invention, only a part of the absorption solution raised by vapor-lift action in pump 35 is returned to the absorber 26 while another part thereof is constantly recirculated in a local circuit and never reaches the absorber, in the manner just described, and the absorption solution flowing to the vapor expulsion unit 10 is divided into separate paths of flow 47 and 48 after the solution passes through the liquid heat exchanger 31 and before each part of the solution is influenced by the presence of vapor acting in the respective paths of flow to raise the solution by vapor-lift action. The paths of flow 47 and 48 are formed by a partition or dividing wall 49 which extends lengthwise of and within the vapor-lift pump 35.

By employing the partition or dividing wall 49 within the vapor-lift pump 35 to form the parallel passages 47 and 48 which extend upwardly from the region at which the lower end of the pump 35 is connected to the standpipe 33, an arrangement is provided for accurately dividing absorption solution flowing into the passages 47 and 48 depending upon the position of the partition or dividing wall within the vapor-lift pump 35. Hence, after absorption solution enriched in refrigerant flows through the inner passage 30 of liquid heat exchanger 31, such solution descending in the standpipe 33 is accurately divided into two parallel paths of flow at the lower inlet end of the vapor-lift pump 35.

The vertically extending section of vapor-lift pump 35, which is in thermal exchange relation with the heating tube 12 at 36, may be referred to as the heat receiving and vapor forming part of the lift pipe or pump. It is at the region of the thermal connection 36 that vapor is formed and expelled from solution in each of the paths of flow 47 and 48 due to heating effected by the heating tube 12. Hence, it is at the region of the thermal connection 36 that absorption solution in each of the passages 47 and 48 is initially brought into the presence of vapor and influenced by the latter. Due to heating effected by the heating tube 12, such vapor is expelled from solution in each of the passages 47 and 48 to raise liquid by vapor-lift action under the influence of the reaction head formed by the liquid column in the standpipe 33. In other words, the weight of the column of liquid in standpipe 33 overbalances the weight of the column of segregated liquid bodies and vapor in the passages 47 and 48 to cause rising of liquid in both passages at the same time. The vapor bubbles formed in the passages 47 and 48, at the region of the thermal connection 36 to the heating tube 12, tend to collect and become larger and larger and become effective to segregate liquid in the passages. The slugs of liquid formed in this way are raised by the vapor-lift action because the cross-sectional areas of the passages 47 and 48 are sufficiently small, so that vapor cannot freely pass liquid in the passages 47 and 48.

The vessel 41 not only provides the chambers 42 and 43 into which liquid is discharged from the upper ends of the passages 47 and 48, respectively, but also serves as a vapor separator in which lifting vapor is separated from raised liquid. In Fig. 1 it will be seen that a gap 50 is provided at the upper end of the partition 44, so that vapor can freely pass from one chamber to the other in the vessel 41. Further, the conduits 45 and 46 may be sufficiently large in cross-section so that vapor discharged from the upper ends of the passages 47 and 48 can flow either into the upper end of the boiler 11 or into the upper part of the standpipe 33. Conversely, vapor expelled from solution in boiler 11 can flow through conduits 45 and 46 and the vessel 41 into the upper part of standpipe 33 and flow therefrom through conduit 16 to the condenser 18.

The dividing wall 49 within the vapor-lift pump 35 projects upwardly from the extreme upper end of the pump and, with the partition 44 in the vessel 41, forms a unitary wall to divide the vessel into the adjoining chambers 42 and 43, as explained above.

The embodiment of Fig. 2, in which parts similar to those shown in Fig. 1 are designated by the same reference numerals, differs from the embodiment just described in that a pair of vapor-lift pump pipes 35' and 35" are employed to provide the passages 47' and 48', respectively. In Fig. 2 both of the pump pipes 35' and 35" are connected at their lower ends to the bottom of the standpipe 33. The upper end of pump pipe 35' is connected to the top part of the boiler 11, and the upper end of the pump pipe 35" is connected to the upper part of the standpipe 33. The pipes 35' and 35" are in thermal exchange relation with the heating tube 12 at 36' and 36", respectively.

In Fig. 2 absorption solution flows from the inner passage 30 of liquid heat exchanger 31 into the standpipe 33. Solution in the bottom part of the standpipe 33 is introduced into the lower inlet ends of the vapor-lift pump pipes 35' and 35", thus accurately dividing the solution into two paths of flow. Liquid in each path of flow initially passes into the presence of vapor which is formed in the vertically extending sections of the vapor-lift pump pipes 35' and 35" thermally connected to the heating tube 12 at 36' and 36", respectively. Such vapor expelled from solution by heat derived from the heating tube 12 effects upward movement of liquid in the passages 47' and 48' by vapor-lift action, in the same manner liquid is raised in the passages 47 and 48 in the first-described embodiment.

In both of the embodiments of Figs. 1 and 2, the manner in which absorption solution is divided into two paths of flow, after passing through the liquid heat exchanger and before flowing into the presence of lifting vapor, makes it possible to establish ideal pumping conditions in the vapor expulsion unit without circulating an excessive quantity of solution through the absorber 26. By constantly recirculating a part of the raised absorption solution in a local circuit in which solution never reaches the absorber 26, such local circuit including the several passages of the vapor-lift pump, the ratio of the quantity of weak absorption solution being circulated to the quantity of refrigerant vapor generated is such that reliable functioning of the vapor-lift pump is insured. At the same time, excessive circulation of absorption solution through the liquid heat exchanger and absorber is avoided, wherefor the liquid heat exchanger operates more efficiently and is not likely to be overloaded and the absorber functions better to provide for the evaporator inert gas having the weakest possible concentration of refrigerant.

By constantly recirculating a part of the raised absorption solution in a local circuit in which the solution never reaches the absorber 26, as just explained, it will be evident that, under all operating conditions encountered, liquid is always raised simultaneously by vapor-lift action in the passages 47 and 48 in Fig. 1 and in the lift pipes 47′ and 48′ in Fig. 2, the liquid in the passages of Fig. 1 and lift pipes of Fig. 2 being raised from the same level at the place of pumping under the influence of a common reaction head formed by absorption liquid in standpipe 33 before division thereof is effected.

In view of the foregoing, it will now be understood that each of the passages 47 and 48 in Fig. 1 and each of the lift pipes 47′ and 48′ in Fig. 2 may be of a particular size, so that a definite part or percentage of the absorption liquid will be raised in each pump line communicating with the boiler 11 or standpipe 33. Further, the rate at which heat from the heating tube 12 is supplied to each of the passages 47 and 48 in Fig. 1 and lift pipes 47′ and 48′ in Fig. 2 may be adjusted by the manner in which passages and lift pipes are thermally connected to the heating tube. In this way, the quantity of liquid raised per unit interval of time in each of the passages 47 and 48 and lift pipes 47′ and 48′ also can be controlled. In certain instances it also may be desirable to raise or lift absorption liquid to different levels in the passages 47 and 48 in Fig. 1 and lift pipes 47′ and 48′ in Fig. 2.

Although I have shown and described particular embodiments of my invention, it will be obvious to those skilled in the art that various changes and modifications may be made without departing from the spirit and scope of the invention, as pointed out in the following claims.

What is claimed is:

1. In the art of refrigeration with a system having a place of absorption and a place of pumping at which absorption liquid is raised or lifted from one level by vapor-lift action to a higher level for gravity flow to the place of absorption, the improvement which comprises flowing absorption liquid from the place of absorption to the place of pumping in heat exchange relation with absorption liquid flowing from the place of pumping to the place of absorption, thereafter dividing the absorption liquid flowing from the place of absorption into several paths of flow leading to the place of pumping, effecting such division of absorption liquid before the liquid in the respective paths of flow is influenced by the presence of vapor acting to raise the liquid by vapor-lift action at the place of pumping and, under all operating conditions encountered, always raising the liquid simultaneously in the respective paths of flow by vapor-lift action from substantially the same one level at the place of pumping under the influence of a common reaction head formed by absorption liquid before division thereof is effected, and flowing raised liquid in one of the paths of flow from said higher level to the place of absorption and flowing raised liquid in another of the paths of flow from said higher level to the place of pumping for recirculation therethrough without passing through the place of absorption.

2. The improvement set forth in claim 1 in which absorption liquid flowing from the place of absorption, after flowing in heat exchange relation with absorption liquid from the place of pumping, flows to a place for maintaining an upright liquid column having a liquid surface at substantially the same level as the liquid surface at the place of absorption, and introducing absorption liquid from the bottom part of said liquid column into the several paths of flow leading to the place of pumping and, under all operating conditions encountered, always raising the liquid simultaneously in the respective paths of flow by vapor-lift action from substantially the same one level at the place of pumping under the influence of the common reaction head which is formed by said liquid column.

3. The improvement set forth in claim 1 which includes the step of heating liquid in the respective paths of flow to produce vapor whose presence influences the liquid and acts to raise the liquid by vapor-lift action, and always producing vapor in each path of flow at a rate sufficient to raise liquid simultaneously in the respective paths of flow under all operating conditions encountered.

4. In absorption refrigeration apparatus, a circuit for absorption liquid comprising a plurality of parts including a generator or boiler member and an absorber and a liquid heat exchanger therebetween for flowing absorption liquid from said generator to said absorber in heat exchange relation with absorption liquid flowing from said absorber to said generator, and a vapor-lift pump for raising liquid in which vapor cannot freely pass liquid therein, means operable to provide vapor for said pump to effect raising of liquid, conduit means in said circuit forming a vertically extending column for absorption liquid from said liquid heat exchanger and also providing several passages for dividing such absorption liquid and conducting such liquid to said generator or boiler member, said vapor-lift pump including vertically extending portions of said passages, said means operable to provide vapor for said pump being at a zone which is removed from the inlet ends of said passages and essentially at the same level with respect to the vertically extending portions of said passages, said means operable to provide vapor and the vertically extending portions of said passages being so constructed and formed that, whenever liquid is being raised by vapor-lift action in one of the passages during operation of the apparatus, liquid simultaneously is being raised by vapor-lift action in another of said passages, means for conducting to said absorber one part of the raised liquid from the upper end of the vertically extending portion of said one passage, and means for conducting raised liquid from the upper end of the vertically extending portion of said other passage in a path of flow which by-passes said absorber and conducts liquid to said conduit means to be divided again by the passages provided by the latter, the liquid in said column providing a common reaction head under the influence of which liquid is raised in both of the vertically extending portions of said passages by vapor-lift.

5. Apparatus as set forth in claim 4 including means in said circuit for conducting the one part of the raised liquid to said boiler member and from the latter to said absorber.

6. Apparatus as set forth in claim 4 including a vertically extending conduit providing said vertically extending column, means for conducting to the upper part of said vertically extending conduit from said liquid heat exchanger absorption liquid flowing from said absorber, said conduit means providing said several passages communicating with the lower part of said vertically extending conduit.

7. Apparatus as set forth in claim 6 in which said means for conducting raised absorption liquid in a path of flow which by-passes said absorber includes said vertically extending conduit.

8. Apparatus as set forth in claim 4 in which said vapor-lift pump comprises a single vertically extending pipe having a partition therein to provide two paths of flow, each of said last-mentioned paths of flow forming a vertically extending portion of one of said passages.

9. Apparatus as set forth in claim 4 in which said vapor-lift pump comprises a pair of vertically extending pipes, each of said pipes forming a vertically extending portion of one of said passages.

References Cited in the file of this patent

UNITED STATES PATENTS

| | | |
|---|---|---|
| 2,169,214 | Bergholm | Aug. 15, 1939 |
| 2,287,855 | Babcock | June 30, 1942 |
| 2,422,401 | Gaugler | June 17, 1947 |

FOREIGN PATENTS

| | | |
|---|---|---|
| 669,795 | Great Britain | Apr. 9, 1952 |
| 674,289 | Great Britain | June 18, 1952 |
| 858,257 | Germany | Dec. 4, 1952 |
| 1,026,761 | France | Feb. 11, 1953 |